United States Patent
Risner, Jr. et al.

[19]

[11] Patent Number: 6,099,882
[45] Date of Patent: Aug. 8, 2000

[54] METHOD AND APPARATUS FOR ROASTING AND SMOKING SKINNED FOOD PRODUCTS

[75] Inventors: Spencer Charles Risner, Jr., Hollister; Greg M. Durst, Yuba City; Salvatore C. Felice, Hollister, all of Calif.

[73] Assignee: California Fire-Roasted, L.L.C., West Sacramento, Calif.

[21] Appl. No.: 09/327,115

[22] Filed: Jun. 7, 1999

Related U.S. Application Data

[63] Continuation of application No. 09/190,103, Nov. 12, 1998, abandoned.
[60] Provisional application No. 60/098,562, Nov. 12, 1997.

[51] Int. Cl.[7] ....................................................... A23L 1/01
[52] U.S. Cl. ...................... 426/314; 426/465; 426/466; 426/469; 426/478; 426/479; 426/481; 426/482; 99/443 C; 99/469; 99/477; 99/482; 99/484; 99/567; 99/584
[58] Field of Search ..................................... 426/314, 465, 426/466, 469, 478, 479, 481, 482, 483; 99/443 C, 469, 477, 386, 482, 518, 567, 584, 484

[56] References Cited

U.S. PATENT DOCUMENTS

5,447,737   9/1995   Blandine et al. ........................ 426/484

*Primary Examiner*—Milton Cano
*Attorney, Agent, or Firm*—Martine Penilla & Kim, LLP

[57] ABSTRACT

A system for preparing a skinned food product includes a roasting unit, a smoking chamber, and a conveyor system for transporting the skinned food product through the roasting unit and through the smoking chamber. The roasting unit has a heated zone for at least partially loosening the skin of the skinned food product. The heat in the heated zone may also blacken portions of the skinned food product. The conveyor system rotates the skinned food product as the product passes through the heated zone. The contact with the smoke in the smoking chamber provides the skinned food product with a desired flavor. A method for preparing a skinned food product includes contacting the product with heat to at least partially loosen a skin thereof, and contacting the product with smoke for a period of time sufficient to provide the product with a smoked flavor. The system and method may be used to prepare skinned food products such as tomatoes, peppers, onions, garlic, corn, potatoes, and artichokes.

35 Claims, 10 Drawing Sheets

METHOD AND APPARATUS FOR ROASTING AND SMOKING SKINNED FOOD PRODUCTS

This application is continuation of U.S. application Ser. No. 09/190,103 filed Nov. 12, 1998, now abandoned which claims the benefit of U.S. Provisional Application No. 60/098,562, filed Nov. 12, 1997, the disclosure of which is incorporated herein by reference for all purposes.

BACKGROUND OF THE INVENTION

The present invention relates generally to food processing and, more particularly, to a system and method for preparing skinned food products.

In recent years roasting has become a popular preparation technique for a variety of food products. One known commercial roasting device is a drum-type roaster in which the food product is rotated in a heated drum. Another known commercial roasting device is a belt-type roaster in which the food product is carried on a belt through a heated section that is heated by a resistance heating element. These known roasting devices, however, suffer from significant disadvantages when used to prepare skinned food products such as tomatoes, peppers, and onions. One disadvantage is that skinned food products generally lack flavor when they are prepared in these known roasting devices. Another disadvantage is that these known roasting devices do not provide the prepared food product with the aesthetically pleasing visual appearance obtained by flame roasting.

In view of the foregoing, there is a need for a preparation technique that not only provides a skinned food product with an aesthetically pleasing visual appearance, but also imparts flavor to the skinned food product.

SUMMARY OF THE INVENTION

Broadly speaking, the invention fills this need by providing a preparation technique in which a skinned food product is contacted with heat to provide the skinned food product with an aesthetically pleasing visual appearance and contacted with smoke to provide the skinned food product with a desired flavor.

In one aspect of the invention, a system for preparing a skinned food product is provided. In one embodiment, the system includes a roasting unit, a smoking chamber, and a conveyor system for transporting the skinned food product through the roasting unit and through the smoking chamber. The roasting unit has a heated zone that provides the skinned food product with an aesthetically pleasing visual appearance. Specifically, the heat in the heated zone at least partially loosens the skin of the skinned food product. The heat in the heated zone may also blacken portions of the skin of the skinned food product. The contact with the smoke in the smoking chamber provides the skinned food product with a desired flavor.

The heated zone in the roasting unit is preferably heated by a gas burner. The roasting unit may further include a fluid spray for spraying a fluid on the skinned food product to remove loosened pieces of skin therefrom. The gas burner is coupled with a source of gas and the fluid spray is coupled with a source of fluid, which may be either a liquid or a gas. The fluid spray is preferably a spray rod having at least one spray nozzle and the preferred fluid is water. The smoking chamber is preferably coupled in flow communication with a smoke generating unit.

The conveyor system preferably rotates the skinned food product as the product passes through the heated zone. When the roasting unit includes a gas burner and a fluid spray, the conveyor system preferably rotates the skinned food product as the product passes in proximity to the gas burner and as the skinned food product passes in proximity to the fluid spray.

In a preferred embodiment, the roasting unit includes a housing having an inlet and an outlet. A gas burner and a water spray are disposed within the housing, with the water spray being disposed between the gas burner and the outlet. The gas burner is coupled with a source of gas and the water spray is coupled with a source of water. The smoking chamber includes a housing having an inlet and an outlet. Suction fans are provided at the inlet and the outlet of the smoking chamber to draw any smoke flowing out of the smoking chamber into vents. The conveyor system transports the skinned food product from the inlet of the roasting unit to the outlet of the roasting unit and from the inlet of the smoking chamber to the outlet of the smoking chamber. The conveyor system preferably includes a first conveyor subsystem for transporting the skinned food product from the inlet of the roasting unit to the outlet of the roasting unit and a second conveyor subsystem for transporting the skinned food product from the inlet of the smoking chamber to the outlet of the smoking chamber.

The first conveyor subsystem preferably includes a conveyor having a belt comprised of a plurality of rollers, each of the rollers having a sprocket coupled thereto. A drive chain is coupled to at least some of the rollers. A first drive pulley is provided to drive the drive chain to move the rollers transversely from the inlet of the roasting unit to the outlet of the roasting unit. A spinner chain is configured to engage with the sprockets coupled to the rollers as the rollers pass in proximity to the gas burner and as the rollers pass in proximity to the water spray. A second drive pulley is provided to drive the spinner chain to rotate the rollers when the sprockets coupled to the rollers are engaged with the spinner chain.

The second conveyor subsystem preferably includes a first conveyor configured to receive the skinned food product from the conveyor of the first conveyor subsystem and to carry the skinned food product into the smoking chamber through the inlet thereof. A second conveyor carries the skinned food product in a direction substantially opposite to a direction of the first conveyor. A third conveyor carries the skinned food product out of the smoking chamber through the outlet thereof in a direction substantially opposite to the direction of the second conveyor.

In another aspect of the invention, a first method of preparing a skinned food product is provided. In this method a skinned food product is contacted with heat to at least partially loosen a skin thereof. The skinned food product is then contacted with smoke for a period of time sufficient to provide the skinned food product with a smoked flavor. After the skinned food product is contacted with heat, the method may further include spraying the skinned food product with a fluid to remove loosened pieces of skin therefrom.

The skinned food product is preferably contacted with heat by passing the skinned food product in proximity to a flame. The skinned food product is preferably contacted with smoke by passing the skinned food product through a smoking chamber. The fluid sprayed on the skinned food product may be either a liquid or a gas.

In a further aspect of the invention, a second method of preparing a skinned food product is provided. In this method a skinned food product is passed in proximity to a flame to at least partially blacken a skin thereof. The skinned food product is then passed through a smoking chamber. After the skinned food product is passed in proximity to the flame, the method may further include spraying the skinned food product with water to remove loosened pieces of skin therefrom.

The skinned food product is preferably rotated as the skinned food product passes in proximity to the flame and as the skinned food product is sprayed with water. The skinned food product is preferably held in the smoking chamber for a period of time sufficient to provide the skinned food product with a smoked flavor.

In a still further aspect of the invention, skinned food products prepared by the methods of the present invention are provided. The skinned food products which may be prepared by the methods of the present invention include, but are not limited to, tomatoes, peppers, onions, garlic, corn, potatoes, and artichokes.

The invention advantageously provides skinned food products that have a flame roasted visual appearance and a smoked flavor. The system of the invention enables the in-line, continuous roasting and smoking of large quantities of skinned food products. By way of example, the system of the invention is capable of processing about 10 tons/hour of tomatoes.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

Reference will now be made to the present preferred embodiments of the invention, examples of which are illustrated in the accompanying drawings.

Figure 1:
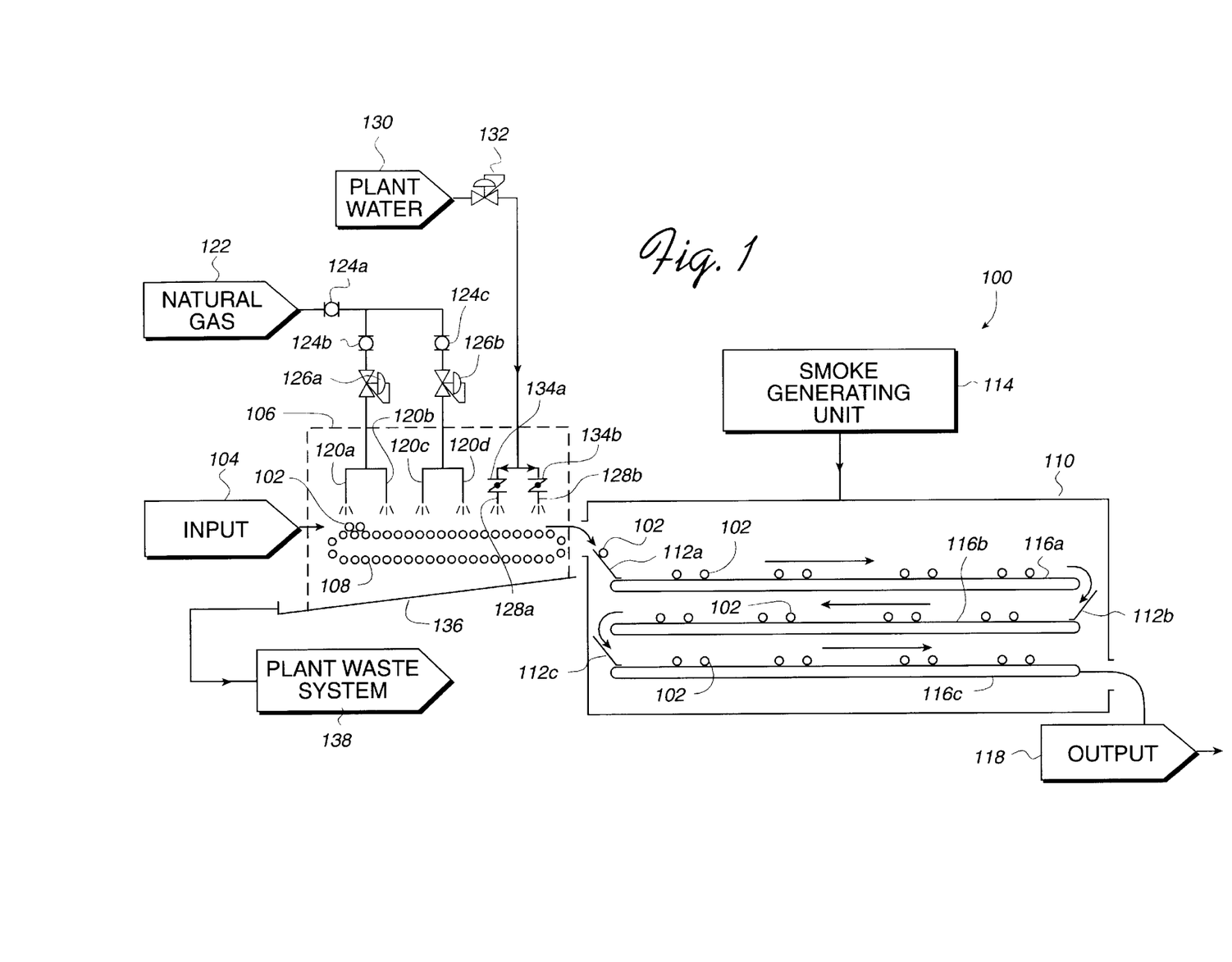
FIG. 1 shows a schematic diagram of the system for preparing a skinned food product in accordance with one embodiment of the present invention.

FIG. 1 shows a schematic diagram of system 100 for preparing a skinned food product 102 in accordance with one embodiment of the present invention. As used in connection with the description of the invention, the phrase "skinned food product" means any food product having a skin, i.e., an outer membrane or an outer layer. Exemplary skinned food products which may be prepared in system 100 include, but are not limited to, tomatoes, peppers, e.g., bell peppers, jalapeno peppers, etc., onions, garlic, corn, potatoes, and artichokes. As shown in FIG. 1, system 100 includes input device 104 that inputs skinned food product 102 into roasting unit 106. Conveyor 108 transports skinned food product 102 through roasting unit 106 and delivers product 102 into smoking chamber 110 via inlet ramp 112a. Smoking chamber 110 is coupled in flow communication with smoke generating unit 114, which will be described in more detail later. Conveyors 116a, 116b, and 116c transport skinned food product 102 back and forth through smoking chamber 110. Return ramp 112b guides skinned food product 102 from conveyor 116a to conveyor 116b and return ramp 112c guides product 102 from conveyor 116b to conveyor 116c. Skinned food product 102 exits smoking chamber 110 from conveyor 116c via output device 118.

With continuing reference to FIG. 1, roasting unit 106 includes gas burners 120a, 120b, 120c, and 120d disposed above conveyor 108 and coupled in flow communication with natural gas source 122. Natural gas flows from source 122 through ball valves 124a and 124b and regulator 126a to gas burners 120a and 120b. Natural gas flows from source 122 through ball valves 124a and 124c and regulator 126b to gas burners 120c and 120d. Roasting unit 106 further includes water sprays 128a and 128b disposed above conveyor 108 and coupled in flow communication with plant water source 130. The water flows from source 130 through valve 132 and through butterfly valves 134a and 134b to water sprays 128a and 128b, respectively. Discharge outlet 136 collects water discharged from water sprays 128a and 128b and funnels the collected water to plant waste system 138.

Figure 2:
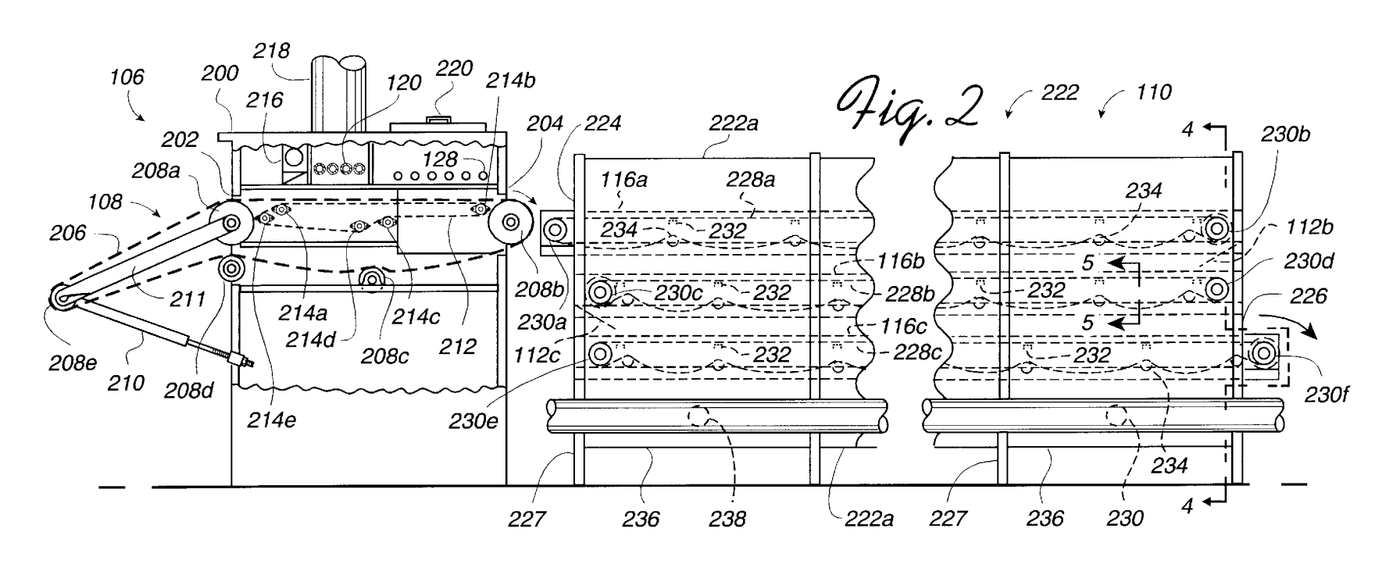
FIG. 2 shows side breakaway views of a roasting unit and a smoking chamber formed in accordance with one embodiment of the present invention.

FIG. 2 shows side breakaway views of roasting unit 106 and smoking chamber 110 formed in accordance with one embodiment of the present invention. Roasting unit 106 includes housing 200 having inlet 202 and outlet 204 through which conveyor 108 passes. As shown in FIG. 2, conveyor 108 includes belt unit 206, which will be described in more detail later, supported on pulleys 208a, 208b, 208c, 208d, and 208e, of which pulley 208b is a drive pulley. Drive pulley 208b, which is coupled to a suitable motor as is known to those skilled in the art, drives belt unit 206 in a clockwise manner. Pulleys 208a, 208b, 208c, and 208d may be mounted on housing 200. Each end of pulley 208e is supported by adjustable support rod 210 coupled to housing 200 and support bar 211 which extends between pulleys 208a and 208e. The portion of belt unit 206 that spans between pulleys 208a and 208e serves the function of input device 104 shown in FIG. 1. Spinner chain 212, the function of which will become apparent later, is supported on pulleys 214a, 214b, 214c, 214d, and 214e, of which pulley 214e is a drive pulley. Drive pulley 214e, which is coupled to a suitable motor as is known to those skilled in the art, drives spinner chain 212 in a counterclockwise manner. Roasting unit 106 further includes blower 216, a plurality of gas burners 120, and a plurality of spray rods 128. Blower 216 dries skinned food product 102, which may be wet, e.g., when input device 104 is a water flume, before product 102 reaches gas burners 120. As shown in FIG. 2, blower 216, gas burners 120, and spray rods 128 are disposed above belt unit 206. Those skilled in the art will recognize that blower 216, gas burners 120, and spray rods 128 also may be disposed below belt unit 206. The heat from the flames produced by gas burners 120 creates a heated zone within housing 200. Exhaust from gas burners 120 exits housing 200 via exhaust vent 218. If desired, housing 200 may be provided with removable lid 220 to facilitate access to burners 120 and spray rods 128 for, e.g., maintenance.

With continuing reference to FIG. 2, smoking chamber 110 includes housing 222 having inlet 224 through which conveyor 116a passes and outlet 226 through which conveyor 116c passes. Housing 222 includes panels 222a that are supported by support members 227 to define an enclosure disposed above ground level. As shown in FIG. 2, conveyor 116a is located adjacent to conveyor 108 such that the skinned food product is transferred directly from belt unit 206 of conveyor 108 to belt 228a of conveyor 116a. This configuration obviates the need for inlet ramp 112a shown in FIG. 1. Belt 228a of conveyor 116a is supported on pulleys 230a and 230b, belt support channels 232, and return rollers 234. Drive pulley 230b, which is coupled to a suitable motor as is known to those skilled in the art, drives belt 228a in a clockwise manner. Conveyor 116b includes belt 228b supported on pulleys 230c and 230d, belt support channels 232, and return rollers 234. Drive pulley 230c, which is coupled to a suitable motor as is known to those skilled in the art, drives belt 228b in a counterclockwise manner. Conveyor 116c includes belt 228c supported on pulleys 230e and 230f, belt support channels 232, and return rollers 234. Drive pulley 230f, which is coupled to a suitable motor as is known to those skilled in the art, drives belt 228c in a clockwise manner. Smoking chamber 110 further includes smoke infeed pipe 236 which is situated outside of housing 222 and coupled in flow communication with smoke generating unit 114 (see FIG. 1). A plurality of smoke inlet pipes 238, which will be described in more detail later, extend from smoke infeed pipe 236 into the lower portion of housing 222.

Figure 3:
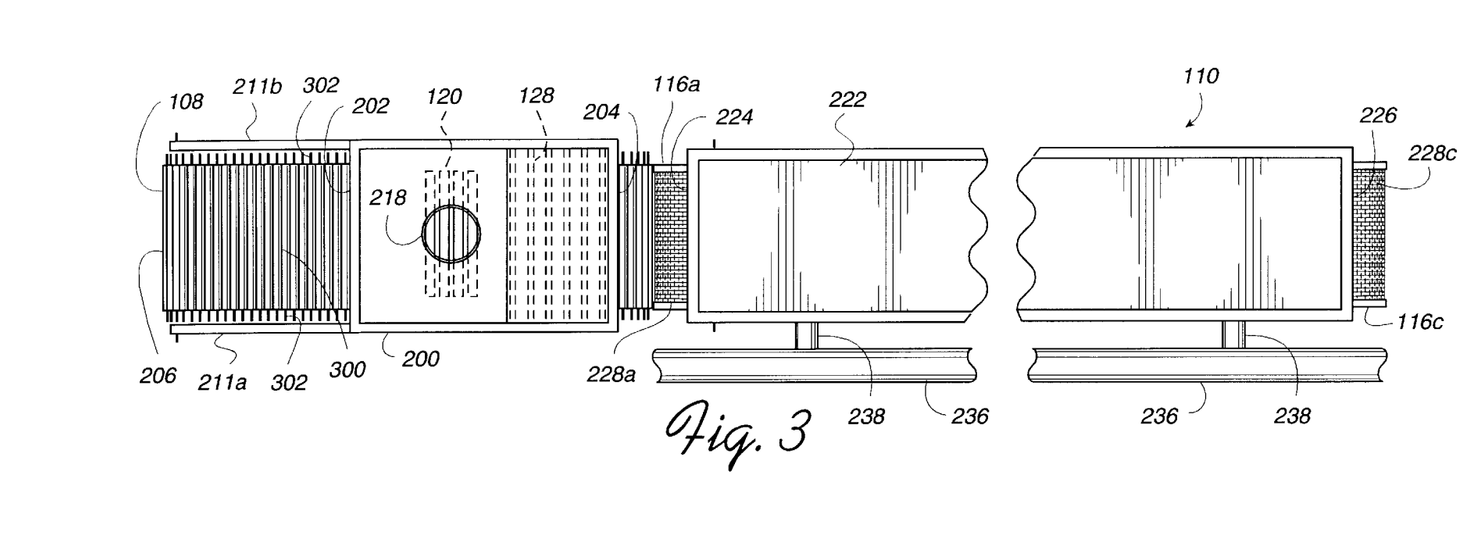
FIG. 3 is a top view of the roasting unit and the smoking chamber as shown in FIG. 2.

FIG. 3 shows a top view of roasting unit 106 and smoking chamber 110 as shown in FIG. 2. Considering first roasting unit 106, conveyor 108 enters housing 200 through inlet 202 and exits housing 200 through outlet 204. As shown in FIG. 3, belt unit 206 of conveyor 108 includes a plurality of rollers 300 each of which has shaft 302 protruding from opposite ends thereof. Shaft 302 preferably extends through roller 300 and may be welded to each end thereof. Support bars 211a and 211b are disposed on opposite sides of belt unit 206. Burners 120 and spray rods 128 disposed within housing 200 are indicated by dashed lines. Turning to smoking chamber 110, conveyor 116a, which includes belt 228a, enters housing 222 through inlet 224. Conveyor 116c, which includes belt 228c, exits housing 222 through outlet 226. Smoke inlet pipes 238 extend from smoke infeed pipe 236 into the lower portion of housing 222.

Figure 4:
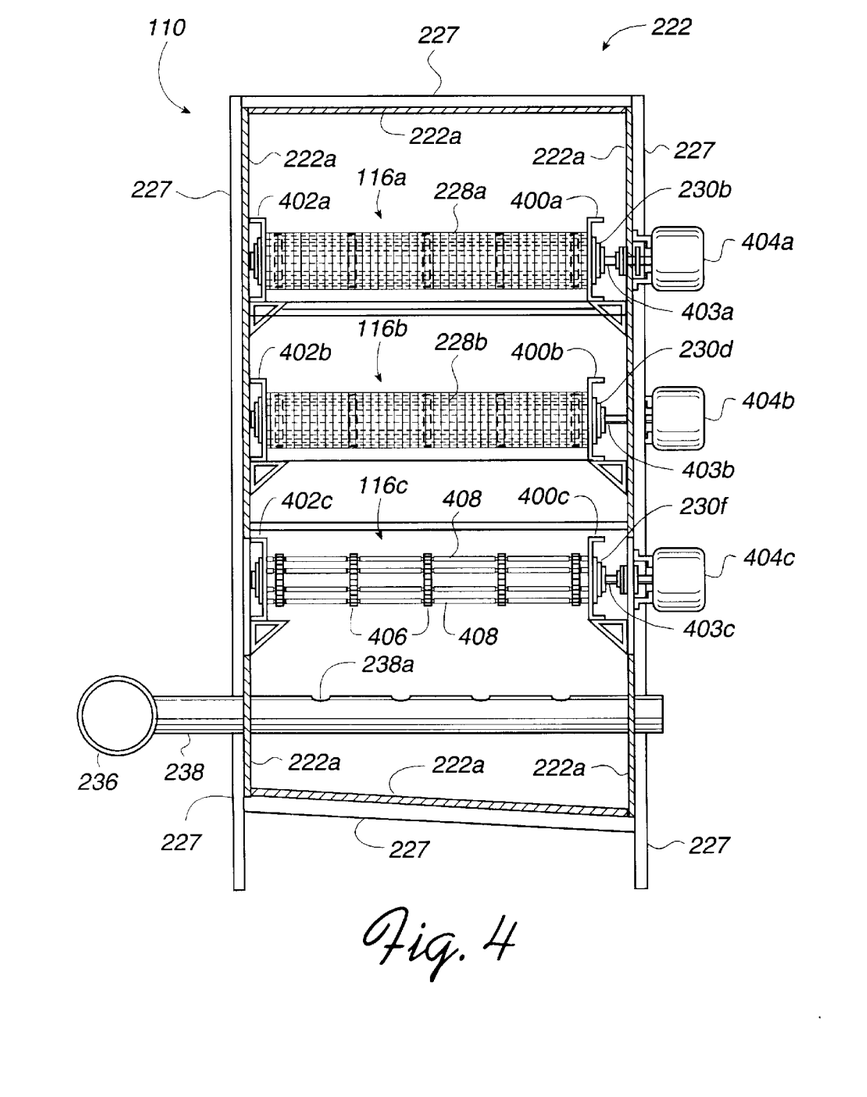
FIG. 4 shows a view of the smoking chamber taken along line 4—4 in FIG. 2.

FIG. 4 shows a view of smoking chamber 110 taken along line 4—4 in FIG. 2. Conveyor 116a includes belt 228a disposed on drive pulley 230b. Drive pulley 230b is supported within housing 222 by angle brackets 400a and 402a and coupled to motor 404a by shaft 403a. Conveyor 116b includes belt 228b disposed on pulley 230d. Pulley 230d is supported within housing 222 by angle brackets 400b and 402b. It is noted that the view shown in FIG. 4 may create the illusion that pulley 230d is coupled to motor 404b by shaft 403b. In actuality, however, drive pulley 230c, which is not visible in FIG. 4 but is located at the end of conveyor 116b opposite from pulley 230d as is shown in FIG. 2, is coupled to motor 404b by shaft 403b. Drive pulley 230f of conveyor 116c is shown without belt 228c (see, e.g., FIG. 3) disposed thereon. As shown in FIG. 4, drive pulley 230f has a generally tubular configuration and includes sprockets 406 that are supported by rods 408. Drive pulley is supported within housing 222 by angle brackets 400c and 402c and coupled to motor 404c by shaft 403c. Smoke inlet pipe 238, which extends from smoke infeed pipe 236 into housing 222 at a point below conveyor 116c, includes a plurality of openings 238a which allow smoke to pass therefrom into the interior of housing 222.

Figure 5:
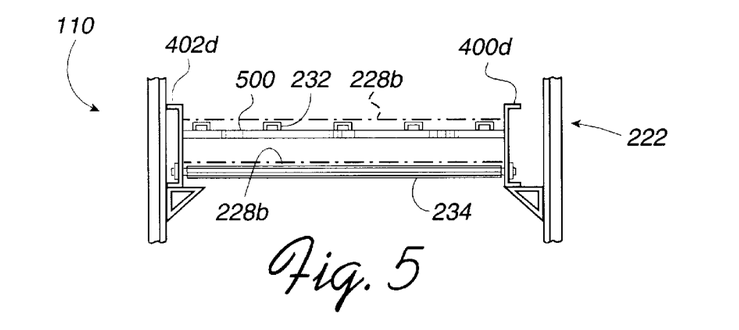
FIG. 5 is a view of the belt supports in the smoking chamber taken along line 5—5 in FIG. 2.

FIG. 5 shows a view of smoking chamber 110 taken along line 5—5 in FIG. 2. As shown in FIG. 5, belt 228b (which is indicated by the dashed line) is supported on belt support channels 232 and return roller 234. Belt support channels 232 are supported by tubular support 500, which is secured to the upper portion of angle brackets 400d and 402d. Return roller 234 is rotatably mounted on the lower portion of angle brackets 400d and 402d.

Figure 6:
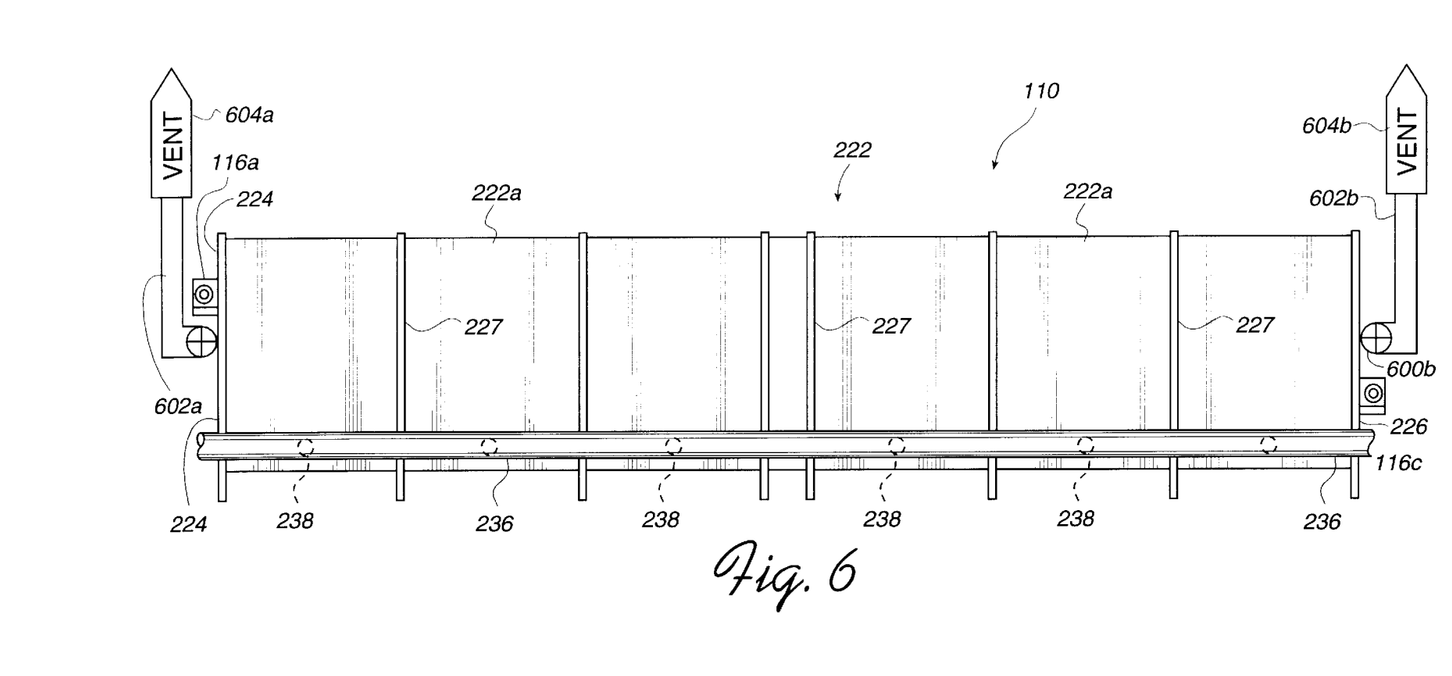
FIG. 6 is a side view of the smoking chamber as shown in FIG. 2, with the addition of a ventilation system.

FIG. 6 shows a side view of smoking chamber 110 as shown in FIG. 2, with the addition of a ventilation system. As shown in FIG. 6, suction fan 600a is disposed below conveyor 116a at inlet 224 of housing 222. Suction fan 600a draws smoke that flows out of inlet 224 into conduit 602a, which channels the smoke to vent 604a. Suction fan 600b is disposed above conveyor 116c at outlet 226 of housing 222. Suction fan 600b draws smoke that flows out of outlet 226 into conduit 602b, which channels the smoke to vent 604b.

Figure 7:
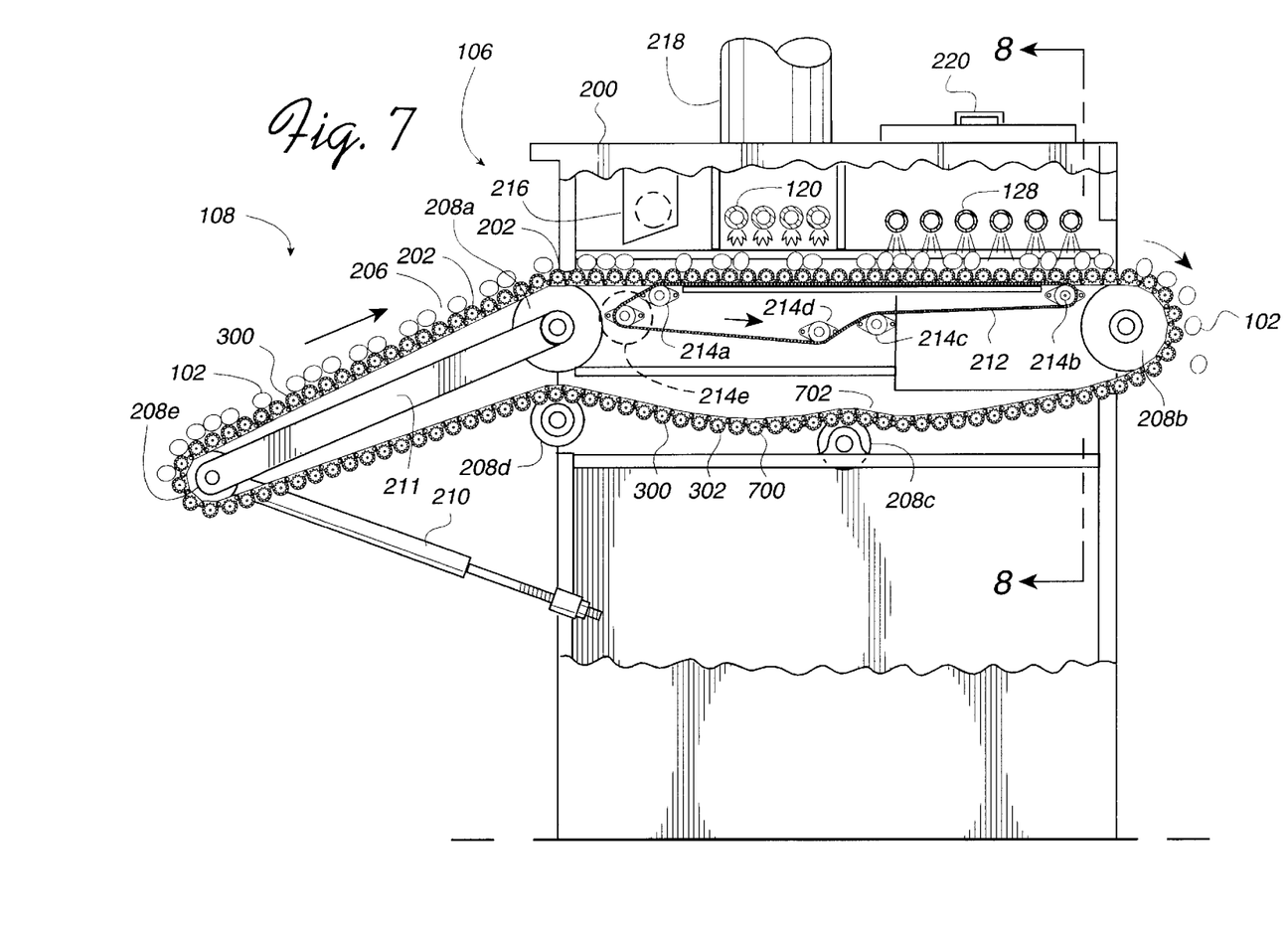
FIG. 7 shows a side breakaway view of a roasting unit formed in accordance with one embodiment of the present invention.

FIGS. 7–10 show further details of a roasting unit formed in accordance with one embodiment of the present invention. FIG. 7 shows of a side breakaway view of roasting unit 106. As shown therein, belt unit 206 of conveyor 108 includes a plurality of rollers 300 each of which has shaft 302 protruding therefrom. Each shaft 302 has sprocket 700 coupled thereto and is rotatably coupled to drive chain 702. Drive pulley 208b rotates belt unit 206 in a clockwise manner by engaging drive chain 702 coupled to shafts 302 of rollers 300. As each roller 300 passes under burners 120 and spray rods 128, the portion of spinner chain 212 which spans between pulleys 214a and 214b engages sprocket 700 secured to shaft 302. As drive pulley 214e rotates spinner chain 212 in a counterclockwise manner, spinner chain 212 causes sprocket 700 and in turn shaft 302 and roller 300 coupled thereto to rotate in a clockwise manner. This rotation of rollers 300 enables skinned food products 102 to be rotated as they pass under burners 120 and as they pass under spray rods 128.

Figure 8:
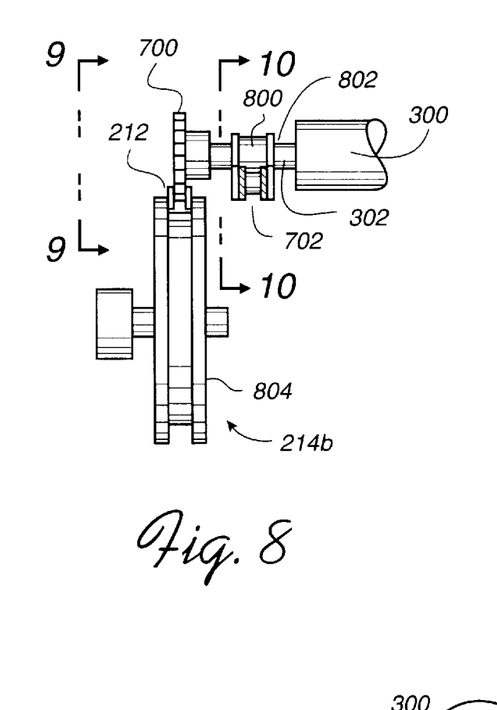
FIG. 8 is a view of the spinner chain and the drive chain taken along line 8—8 in FIG. 7.

FIG. 8 shows a view of drive chain 702 and spinner chain 212 taken along line 8—8 in FIG. 7. As shown in FIG. 8, drive chain 702 includes link 800 having aperture 802 therethrough. Sprocket 700 is secured to the end of shaft 302 opposite from roller 300. Link 800 is rotatably disposed on shaft 302 between sprocket 700 and roller 300. The diameter of aperture 802 in link 800 is large enough so that shaft 302 can rotate without disrupting drive chain 702. Spinner chain 212 supported on idler sprocket 804 of pulley 214b engages sprocket 700 and, when rotated, causes sprocket 700 and in turn shaft 302 and roller 300 to rotate.

Figure 9:
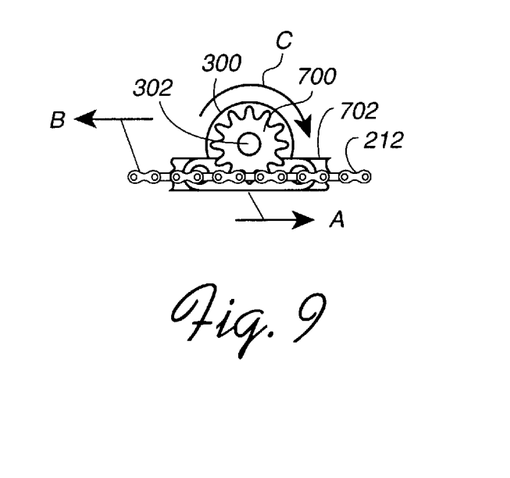
FIG. 9 is a view of the spinner chain, drive chain, sprocket, and roller taken along line 9—9 in FIG. 8.

FIG. 9 shows a view of sprocket 700 taken along line 9—9 in FIG. 8. Drive chain 702 moves in the direction indicated by arrow A. Spinner chain 212 moves in the direction indicated by arrow B. The motion of spinner chain 212 causes sprocket 700 and in turn shaft 302 and roller 300 coupled thereto to rotate in a clockwise manner as indicated by arrow C.

Figure 10:
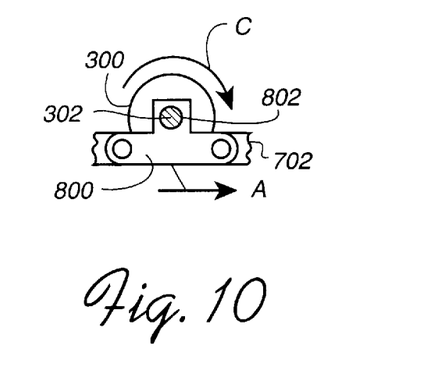
FIG. 10 is a view of the drive chain, shaft, and roller taken along line 10—10 in FIG. 8.

FIG. 10 shows a view of drive chain 702 taken along line 10—10 in FIG. 8. Shaft 302 extends through aperture 802 in link 800 of drive chain 702. As also shown in FIG. 9, shaft 302 and roller 300 rotate in a clockwise manner as indicated by arrow C and drive chain 702 moves in the direction indicated by arrow A.

Figure 11:
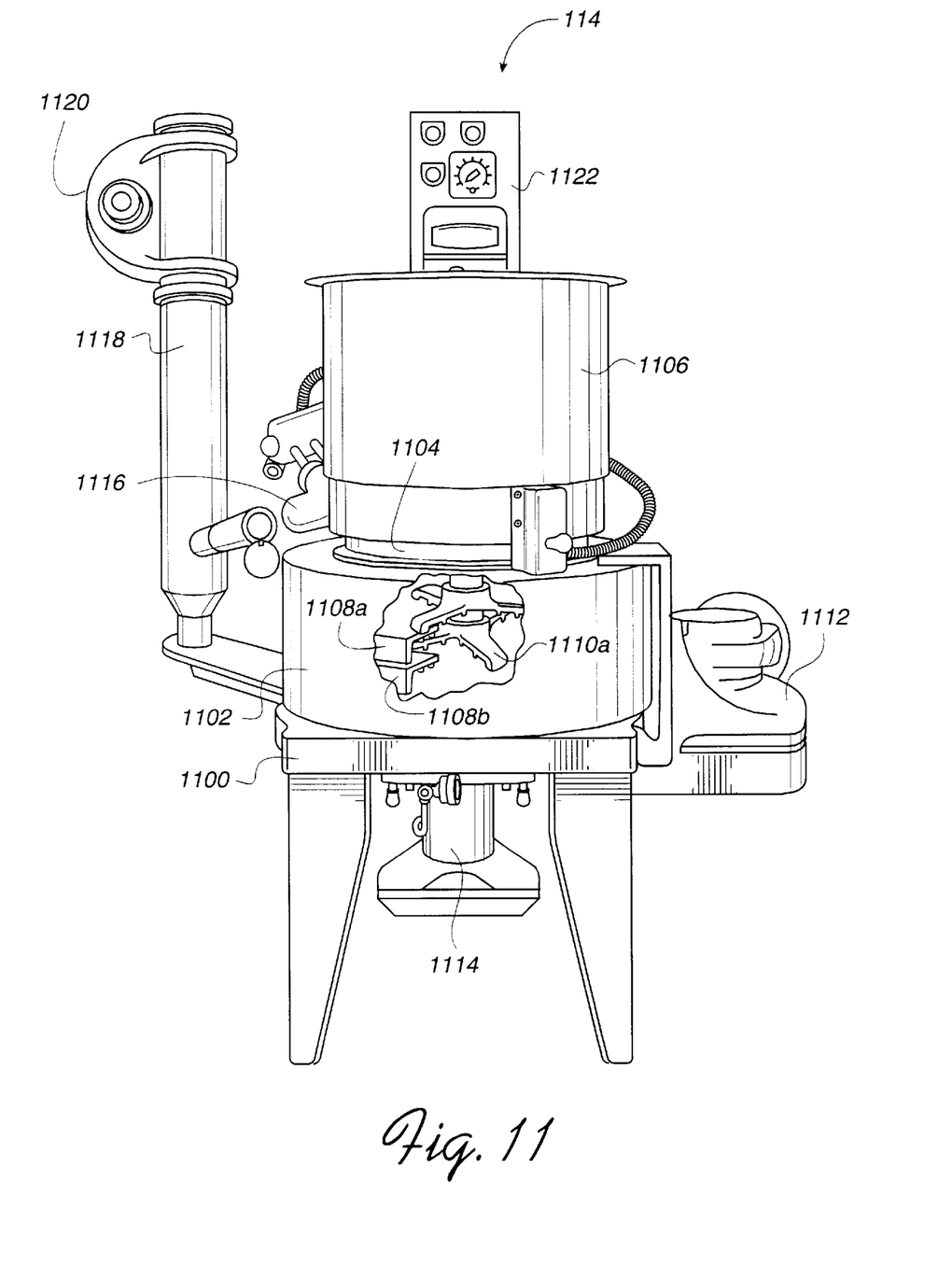
FIG. 11 is a perspective view having a breakaway region of a preferred smoke generating unit for use in the system for preparing a skinned food product of the present invention.

FIG. 11 shows a preferred smoke generating unit 114 for use in system 100. As shown in FIG. 11, smoke generating unit 114 includes base 1100 that supports oven 1102, feed plate housing 1104, and hopper 1106 for storing a supply of sawdust. Oven 1102 includes char plates 1108a and 1108b each of which has a heating element disposed therein. Wiper 1110a, which is driven by motor 1112, rotates within char plate 1108a. A corresponding wiper (not shown in FIG. 11 to simplify illustration) rotates within char plate 1110a. Discharge chute 1114 is provided at the bottom of oven 1102. A flow of water is provided through discharge chute 1114 to prevent air from leaking into oven 1102. Smoke tube 1116, which has a heating element disposed therein, is provided at the top of oven 1102 and channels smoke into tar collector 1118. If necessary, a fan may be provided in fan housing 1120 to create sufficient draft to convey smoke away from smoke generating unit 114. Electrical cabinet 1122 supplies power to the electrical components of smoke generating unit 114 and controls the temperature of the heating elements in the oven and the smoke tube. A smoke generating unit of the type shown in FIG. 11 is commercially available from The Kartridge Pak Co. of Davenport, Iowa (Model SG 10 FS).

The operation of smoke generating unit 114 shown in FIG. 11 may be summarized as follows. Sawdust flows from hopper 1106 through a feed plate (not shown) in feed plate housing 1104 and into oven 1102. Once in oven 1102, the sawdust flows through openings in char plates 1108a and 1108b as the wipers therein, i.e., wiper 1110a and the corresponding wiper in char plate 1108b, rotate to disperse the sawdust. The heat from the heating elements in char plates 1108a and 1108b combusts the sawdust. The smoke generated by the combustion of the sawdust flows out of oven 1102 through smoke tube 1116. The heating element provided in smoke tube 1116 heats the smoke flowing therethrough so that tube 1116 does not become clogged with tar deposits. The smoke then flows through tar collector 1118 and on into smoking chamber 110 via smoke infeed pipe 236 (see, e.g., FIG. 2) which is coupled in flow communication therewith. The spent sawdust, i.e., ash, exits oven 1102 through discharge chute 1114.

The sawdust used in smoke generating unit 114 shown in FIG. 11 is preferably from a hard wood such as, for example, mesquite or hickory. To obtain high quality smoke with a minimum of tar, the sawdust should be granular and have a substantially uniform particle size. The sawdust also should have a low moisture content, e.g., less than 20% moisture. The type of sawdust used determines the flavor profile that the smoke imparts to the skinned food product. Accordingly, those skilled in the art will recognize that the flavor profile that the smoke imparts to the skinned food product may be varied by using different types of sawdust. If desired, the sawdust used in smoke generating unit 114 may be comprised of a mixture of different types of sawdust.

The preferred materials and components for use in roasting unit 106 and smoking chamber 110 of system 100 will now be described. In roasting unit 106 rollers 300 and shafts 302 of belt unit 206 are preferably comprised of stainless steel. Burners 120 are preferably LINOFLAME® burners, which are commercially available from Maxon Corporation of Muncie, Ind. The height at which burners 120 are disposed above belt unit 206 may be adjusted to control the distance between the flame and skinned food product 102. The flame is preferably located in a range from direct contact to about 6 inches above skinned food product 102. Spray rods 128 preferably include a number, e.g., 4–6, of spray nozzles and are preferably arranged in roasting unit 106 such that the spray nozzles of adjacent rods 128 are staggered across belt unit 206. In smoking chamber 110 belts 228a, 228b, and 228c are preferably plastic mesh belts comprised of a suitable plastic material, e.g., polyethylene or polypropylene. Belt support channels 232 are preferably comprised of stainless steel.

The operation of system 100 will now be described in detail. Skinned food product 102 is placed on conveyor 108 that carries product 102 transversely into roasting unit 106 through inlet 202. Alternatively, skinned food product 102 may be first placed on input device 104 that then transfers product 102 to conveyor 108. As skinned food product 102 passes first in proximity to gas burners 120 and then in proximity to spray rods 128, spinner chain 212 rotates rollers 300 which in turn causes product 102 to rotate. The heat from the flames produced by gas burners 120 creates a heated zone that loosens and, if desired, blackens portions of the skin of skinned food product 102. The rotation of skinned food product 102 as product 102 passes in proximity to gas burners 120 allows the skin to be loosened and blackened in a substantially uniform manner. When skinned food product 102 is a tomato, product 102 is preferably held in the heated zone created by gas burners 120 for approximately 3–4 seconds. Those skilled in the art will recognize that the time required to loosen and blacken the skin of other skinned food products may vary from the preferred time range for a tomato. The degree to which gas burners 120 loosen and blacken the skin of skinned food product 102 may be controlled by adjusting the gas flow rate, which is normally about 1,650 cubic feet/hour, the distance between the flame and product 102, and the transverse speed of conveyor 108. Spray rods 128 include spray nozzles which spray water onto skinned food product 102 to remove loosened pieces of skin from product 102 while leaving firmly attached pieces of skin intact. The rotation of skinned food product 102 as product 102 passes in proximity to spray rods 128 allows the loosened pieces of skin to be removed in a substantially uniform manner. The degree to which the water spray removes pieces of loosened skin from skinned food product 102 may be controlled by adjusting the water pressure, the distance between the spray nozzles of spray rods 128 and product 102, and the number of spray rods 128.

After skinned food product 102 passes through outlet 204 of roasting unit 106, conveyor 108 transfers product 102 to smoking chamber 110. Specifically, conveyor 108 transfers skinned food product 102 to conveyor 116a, which carries product 102 into smoking chamber 110 through inlet 224. Smoking chamber 110 is filled with smoke from smoke generating unit 114. The smoke from smoke generating unit 114 is channeled to smoking chamber 110 by smoke infeed pipe 236 and enters chamber 110 through openings 238a in smoke inlet pipes 238. Conveyor 116a delivers skinned food product 102 to ramp 112b, which guides product 102 to conveyor 116b. Conveyor 116b carries skinned food product 102 in a direction substantially opposite to that of conveyor 116a and delivers product 102 to ramp 112c, which guides product 102 to conveyor 116c. Conveyor 116c carries skinned food product 102 in a direction substantially opposite to that of conveyor 116b. Conveyors 116a, 116b, and 116c carry skinned food product 102 back and forth in smoking chamber 110 for a period of time sufficient for the smoke to impart product 102 with a desired flavor profile. When skinned food product 102 is a tomato, product 102 is preferably held in smoking chamber 110 for a period of about 5–7 minutes. Those skilled in the art will recognize that the time required to obtain a desired flavor profile in other skinned food products may vary from the preferred time range for a tomato. For a given type of smoke, the flavor profile imparted to skinned food product 102 is a function the density of the smoke in smoking chamber 110 and the period of time product 102 is held in chamber 110. The smoke density may be increased by increasing the volume of smoke generated by smoke generating unit 114. After skinned food product 102 passes through outlet 226 of smoking chamber 110, conveyor 116c transfers product 102 to output device 118. During operation, suction fans 600a and 600b disposed at inlet 224 and outlet 226, respectively, draw any smoke flowing out of smoking chamber 110 into vents 604a and 604b, respectively.

Figure 12:
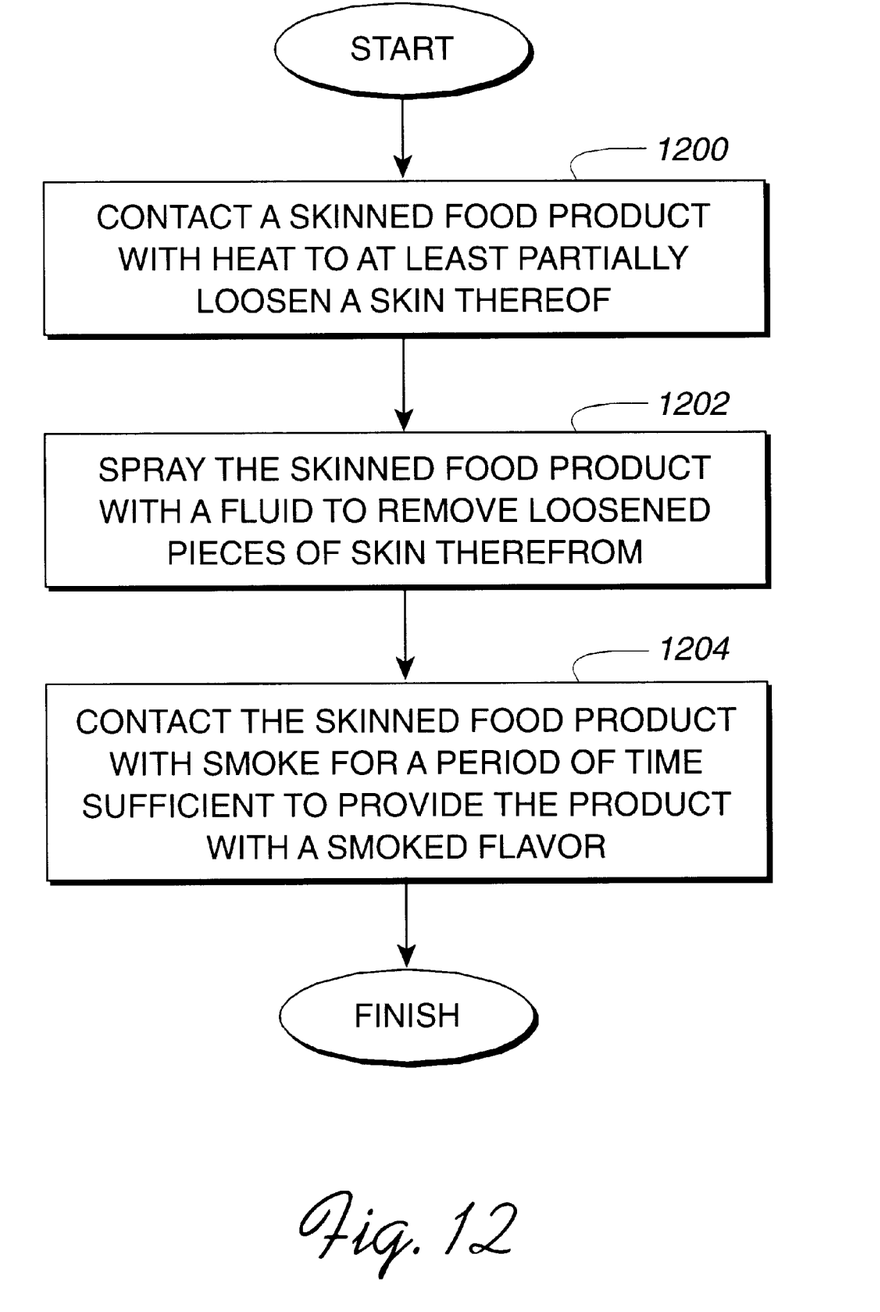
FIG. 12 is a flow diagram illustrating a first method of preparing a skinned food product of the present invention.

FIG. 12 is a flow diagram illustrating a first method of preparing a skinned food product of the present invention. In operation 1200 a skinned food product is contacted with heat to at least partially loosen a skin thereof. The heat may also blacken portions of the skin of the skinned food product. The skinned food product is preferably contacted with heat by passing the product in proximity to a flame. Alternatively, the skinned food product may be contacted with heat by passing the product through a zone heated by, e.g., a resistance heating element, convection, microwave radiation, or infrared radiation.

In operation 1202 the skinned food product is sprayed with a fluid to remove loosened pieces of skin therefrom. The fluid may be either a liquid, e.g., water, or a gas, e.g., air. The spraying parameters, e.g., fluid pressure, distance from source of spray to skinned food product, etc., may be varied to control the amount of loosened skin which is removed from the skinned food product. One method of implementing operations 1200 and 1202 is to pass the skinned food product through roasting unit 106 described herein (see, e.g., FIG. 7). Those skilled in the art will recognize, however, that the use of roasting unit 106 is not necessary to implement operations 1200 and 1202.

In operation 1204 the skinned food product is contacted with smoke for a period of time sufficient provide the product with a smoked flavor. The skinned food product is preferably contacted with smoke by passing the product through a smoking chamber, e.g., smoking chamber 110 (see, e.g., FIG. 2). Those skilled in the art will recognize that the implementation of operation 1204 is not limited to the use of a smoking chamber having the configuration of smoking chamber 110 described herein. In the case that the skinned food product is a tomato, the product is preferably contacted with smoke for about 5–7 minutes. The period of time required to provide other skinned food products, e.g., peppers, onions, garlic, corn, potatoes, and artichokes, with a smoked flavor may vary from the preferred time range for a tomato.

Figure 13:
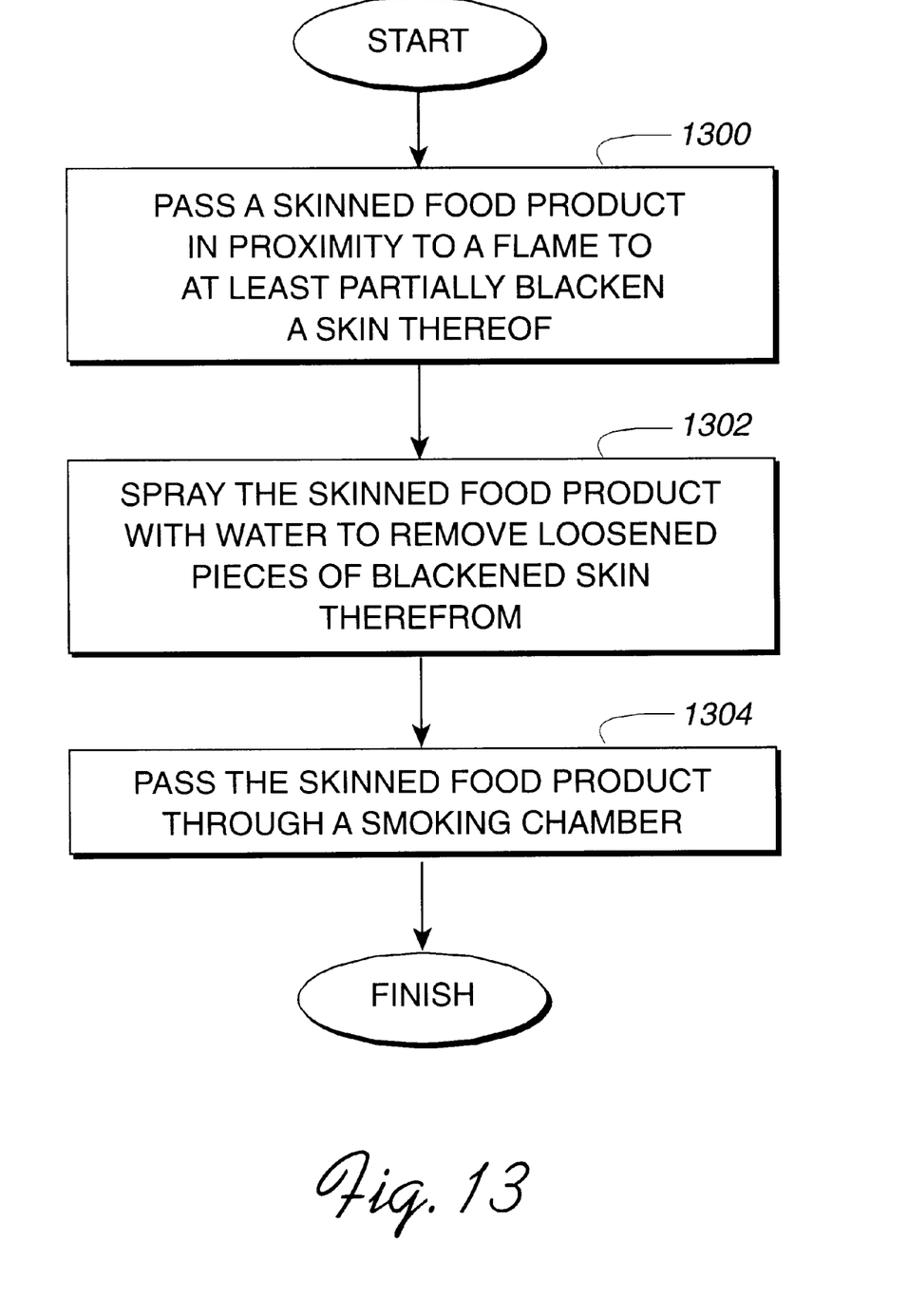
FIG. 13 is a flow diagram illustrating a second method of preparing a skinned food product of the present invention.

FIG. 13 is a flow diagram illustrating a second method of preparing a skinned food product of the present invention. In operation 1300 a skinned food product is passed in proximity to a flame to at least partially blacken a skin thereof. The heat from the flame may also loosen portions of the skin of the skinned food product. In operation 1302 the skinned food product is sprayed with water to remove loosened pieces of blackened skin therefrom. The spraying parameters, e.g., water pressure, distance from source of spray to skinned food product, etc., may be varied to control the amount of loosened, blackened skin which is removed from the skinned food product. One method of implementing operations 1300 and 1302 is to pass the skinned food product through roasting unit 106 described herein (see, e.g., FIG. 7). Those skilled in the art will recognize, however, that the use of roasting unit 106 is not necessary to implement operations 1300 and 1302.

In operation 1304 the skinned food product is passed through a smoking chamber, e.g., smoking chamber 110 (see, e.g., FIG. 2). Those skilled in the art will recognize that the implementation of operation 1304 is not limited to the use of a smoking chamber having the configuration of smoking chamber 110 described herein. The skinned food product is passed through the smoking chamber at a rate that allows the smoke to provide the product with a desired flavor profile. As stated above, the preferred smoking time for a tomato is about 5–7 minutes and the smoking times for other skinned food products, e.g., peppers, onions, garlic, corn, potatoes, and artichokes, may vary from the preferred time range for a tomato.

A number of modifications that may be made to roasting unit 106 will now be described. As shown and described herein, the heated zone in roasting unit 106 is created by gas burners 120. Those skilled in the art will recognize that the heated zone also may be created by, e.g., a resistance heating element, convection, microwave radiation, or infrared radiation. Furthermore, spray rods 128 in roasting unit 106 are coupled with plant water source 130 such that water is sprayed therefrom. Those skilled in the art will recognize that other fluids may be sprayed from spray rods 128 including liquids, e.g., an aqueous solution containing a preservative, and gases, e.g., air.

In summary, the present invention provides a system and method in which a skinned food product is contacted with heat to provide the skinned food product with an aesthetically pleasing visual appearance and contacted with smoke to provide the skinned food product with a desired flavor. The invention has been described herein in terms of several preferred embodiments. Other embodiments of the invention will be apparent to those skilled in the art from consideration of the specification and practice of the invention. For example, as mentioned above, the roasting unit of the system of the invention may be modified to change the manner in which the heated zone is created or to change the fluid sprayed from the spray rods. The embodiments and preferred features described above should be considered exemplary, with the invention being defined by the appended claims.

What is claimed is:

1. A method of preparing a skinned food product, comprising:

contacting a skinned food product with heat to at least partially loosen a skin thereof; and contacting said skinned food product with smoke for a period of time sufficient to provide said skinned food product with a smoked flavor.

2. The method of claim 1, wherein after contacting the skinned food product with heat, the method further includes:

spraying the skinned food product with a fluid to remove loosened pieces of skin therefrom.

3. The method of claim 2, wherein the fluid is a liquid.

4. The method of claim 2, wherein the fluid is a gas.

5. The method of claim 1, wherein the skinned food product is contacted with heat by passing the skinned food product in proximity to a flame.

6. The method of claim 1, wherein the skinned food product is contacted with smoke by passing the skinned food product through a smoking chamber.

7. The method of claim 1, wherein the skinned food product is a tomato.

8. The method of claim 1, wherein the skinned food product is selected from the group consisting of peppers, onions, garlic, corn, potatoes, and artichokes.

9. A skinned food product prepared by the method defined in claim 1.

10. A method of preparing a skinned food product, comprising:

passing a skinned food product in proximity to a flame to at least partially blacken a skin thereof; and passing said skinned food product through a smoking chamber.

11. The method of claim 10, wherein after the skinned food product passes in proximity with the flame, the method further includes:

spraying the skinned food product with water to remove loosened pieces of blackened skin therefrom.

12. The method of claim 10, wherein the skinned food product is rotated as the skinned food product passes in proximity to the flame.

13. The method of claim 11, wherein the skinned food product is rotated as the skinned food product passes in proximity to the flame and as the skinned food product is sprayed with water.

14. The method of claim 10, wherein the skinned food product is held in the smoking chamber for a period of time sufficient to provide the skinned food product with a smoked flavor.

15. The method of claim 10, wherein the skinned food product is a tomato.

16. The method of claim 10, wherein the skinned food product is selected from the group consisting of peppers, onions, garlic, corn, potatoes, and artichokes.

17. A skinned food product prepared by the method defined in claim 10.

18. A system for preparing a skinned food product, comprising:

a roasting unit comprised of a housing having an inlet and an outlet, a gas burner disposed within said housing, and a water spray disposed within said housing between said gas burner and said outlet;

a smoking chamber comprised of a housing having an inlet and an outlet; and a conveyor system for transporting a skinned food product from said inlet of said roasting unit to said outlet of said roasting unit and from said inlet of said smoking chamber to said outlet of said smoking chamber.

19. The system of claim 18, wherein the conveyor system includes a first conveyor subsystem for transporting the skinned food product from the inlet of the roasting unit to the outlet of the roasting unit and a second conveyor subsystem for transporting the skinned food product from the inlet of the smoking chamber to the outlet of the smoking chamber.

20. The system of claim 19, wherein the first conveyor subsystem includes a conveyor having a belt comprised of a plurality of rollers, each of said rollers having a sprocket coupled thereto, a drive chain coupled to at least some of said rollers, a first drive pulley for driving said drive chain to move said rollers transversely from the inlet of the roasting unit to the outlet of the roasting unit, a spinner chain configured to engage with said sprockets coupled to said rollers as said rollers pass in proximity to the gas burner and as said rollers pass in proximity to the water spray, and a second drive pulley for driving said spinner chain to rotate said rollers when said sprockets coupled to said rollers are engaged with said spinner chain.

21. The system of claim 20, wherein the second conveyor subsystem includes a first conveyor configured to receive the skinned food product from the conveyor of the first conveyor subsystem and to carry the skinned food product into the smoking chamber through the inlet thereof, a second conveyor for carrying the skinned food product in a direction substantially opposite to a direction of said first conveyor, and a third conveyor for carrying the skinned food product out of the smoking chamber through the outlet thereof in a direction substantially opposite to said direction of said second conveyor.

22. The system of claim 18, wherein the gas burner is coupled with a source of gas and the water spray is coupled with a source of water.

23. The system of claim 18, wherein the smoking chamber is coupled in flow communication with a smoke generating unit.

24. The system of claim 18, wherein suction fans are provided at the inlet and the outlet of the smoking chamber.

25. The system of claim 18, wherein the water spray is a spray rod having at least one spray nozzle.

26. A system for preparing a skinned food product, comprising:

a roasting unit having a heated zone for at least partially loosening a skin of a skinned food product;

a smoking chamber for smoking said skinned food product; and a conveyor system for transporting said skinned food product through said roasting unit and through said smoking chamber.

27. The system of claim 26, wherein the heated zone is heated by a gas burner.

28. The system of claim 27, wherein the roasting unit further includes a fluid spray for spraying a fluid on the skinned food product to remove loosened pieces of skin therefrom.

29. The system of claim 28, wherein the gas burner is coupled with a source of gas and the fluid spray is coupled with a source of fluid.

30. The system of claim 29, wherein the fluid is selected from the group consisting of a liquid and a gas.

31. The system of claim 30, wherein the liquid is water.

32. The system of claim 26, wherein the conveyor system rotates the skinned food product as the skinned food product passes through the heated zone.

33. The system of claim 28, wherein the conveyor system rotates the skinned food product as the skinned food product passes in proximity to the gas burner and as the skinned food product passes in proximity to the fluid spray.

34. The system of claim 28, wherein the fluid spray is a spray rod having at least one spray nozzle.

35. The system of claim 26, wherein the smoking chamber is coupled in flow communication with a smoke generating unit.

* * * * *

US006099882C1

(12) EX PARTE REEXAMINATION CERTIFICATE (9213th)
United States Patent
Risner, Jr. et al.

(10) Number: US 6,099,882 C1
(45) Certificate Issued: Aug. 21, 2012

(54) METHOD AND APPARATUS FOR ROASTING AND SMOKING SKINNED FOOD PRODUCTS (75) Inventors: Spencer Charles Risner, Jr., Hollister, CA (US); Greg M. Durst, Yuba City, CA (US); Salvatore C. Felice, Hollister, CA (US)

(73) Assignee: California Fire-Roasted, L.L.C., West Sacramento, CA (US)

Reexamination Request:
No. 90/009,890, Apr. 18, 2011

Reexamination Certificate for:
Patent No.: 6,099,882
Issued: Aug. 8, 2000
Appl. No.: 09/327,115
Filed: Jun. 7, 1999

Related U.S. Application Data (63) Continuation of application No. 09/190,103, filed on Nov. 12, 1998, now abandoned.
(60) Provisional application No. 60/098,562, filed on Nov. 12, 1997.

(51) Int. Cl.
*A23B 4/052* (2006.01)
*A23B 4/044* (2006.01)
*A23L 1/01* (2006.01)
*A23L 1/212* (2006.01)
*A23N 12/08* (2006.01)
*A23N 12/00* (2006.01)

(52) U.S. Cl. .......... 426/314; 426/465; 426/466; 426/469; 426/478; 426/479; 426/481; 426/482; 99/443 C; 99/469; 99/477; 99/482; 99/484; 99/567; 99/584

(58) Field of Classification Search .......... 426/120
See application file for complete search history.

(56) References Cited

To view the complete listing of prior art documents cited during the proceeding for Reexamination Control Number 90/009,890, please refer to the USPTO's public Patent Application Information Retrieval (PAIR) system under the Display References tab.

*Primary Examiner* — Norca L Torres Velazquez (57) ABSTRACT

A system for preparing a skinned food product includes a roasting unit, a smoking chamber, and a conveyor system for transporting the skinned food product through the roasting unit and through the smoking chamber. The roasting unit has a heated zone for at least partially loosening the skin of the skinned food product. The heat in the heated zone may also blacken portions of the skinned food product as the product system rotates the skinned food product. The conveyor passes through the heated zone. The contact with the smoke in the smoking chamber provides the skinned food product with a desired flavor. A method for preparing a skinned food product includes contacting the product with heat to at least partially loosen a skin thereof, and contacting the product with smoke for a period of time sufficient to provide the product with a smoked flavor. The system and method may be used to prepare skinned food products such as tomatoes, peppers, onions, garlic, corn, potatoes, and artichokes.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2-3, 5-9, 11 and 14-17, dependent on an amended claim, are determined to be patentable.

New claims 36-43 are added and determined to be patentable.

Claims 4, 12-13 and 18-35 were not reexamined.

1. A method of preparing a skinned food product, comprising:
   *in a roasting unit,* contacting a skinned food product with heat to at least partially loosen a skin thereof *while leaving said skinned food product at least partially uncooked;* and
   *after removing said skinned food product from said roasting unit,* contacting said skinned food product with smoke for a period of time sufficient to provide said skinned food product with a smoked flavor.

10. A method of preparing a skinned food product, comprising:
   passing a skinned food product in proximity to a flame to at least partially blacken a skin thereof *while leaving said skinned food product at least partially uncooked;* and
   passing said skinned food product through a smoking chamber.

36. *A method of preparing a skinned food product, comprising:*
   *in a roasting unit, contacting a skinned food product with heat to at least partially blacken a skin thereof while leaving said skinned food product at least partially uncooked; and*
   *after removing said skinned food product from said roasting unit, contacting said skinned food product with smoke for a period of time sufficient to provide said skinned food product with a smoked flavor.*

37. *A method of preparing a skinned food product, comprising:*
   *in a roasting unit, passing a skinned food product in proximity to a flame to remove a portion of a skin of said skinned food product while leaving a portion of said skin intact, the passing of said skinned food product in proximity to said flame leaving said skinned food product at least partially uncooked; and*
   *after removing said skinned food product from said roasting unit, contacting said skinned food product with smoke for a period of time sufficient to provide said skinned food product with a smoked flavor.*

38. *The method of claim 37, wherein passing the skinned food product in proximity to the flame includes passing the skinned food product in proximity to a first flame disposed above the skinned food product and in proximity to a second flame disposed below the skinned food product.*

39. *A method of preparing a skinned food product, comprising:*
   *in a roasting unit, passing a skinned food product in proximity to a flame to blacken a portion of a skin of said skinned food product while leaving said skinned food product at least partially uncooked; and*
   *after removing said skinned food product from said roasting unit, contacting said skinned food product with smoke for a period of time sufficient to provide said skinned food product with a smoked flavor.*

40. *A method of preparing a tomato, comprising:*
   *in a roasting unit, contacting a tomato with heat to blacken a portion of a skin of said tomato while leaving said tomato at least partially uncooked; and*
   *after removing said tomato from said roasting unit, contacting said tomato with smoke for a period of time sufficient to provide said tomato with a smoked flavor.*

41. *A method of preparing a tomato, comprising:*
   *in a roasting unit, contacting a tomato with heat by passing said tomato in proximity to a flame to provide said tomato with a flame-roasted visual appearance while leaving said tomato at least partially uncooked; and*
   *after removing said tomato from said roasting unit, contacting said tomato with smoke for a period of time sufficient to provide said tomato with a smoked flavor.*

42. *The method of claim 41, wherein passing the tomato in proximity to the flame includes passing the tomato in proximity to a first flame disposed above the tomato and in proximity to a second flame disposed below the tomato.*

43. *A method of preparing a tomato, comprising:*
   *in a roasting unit, passing a tomato in proximity to a flame to remove a portion of a skin of said tomato while leaving a portion of said skin intact, the passing of said tomato in proximity to said flame leaving said tomato at least partially uncooked; and*
   *after removing said tomato from said roasting unit, contacting said tomato with smoke for a period of time sufficient to provide said tomato with a smoked flavor.*

\* \* \* \* \*